United States Patent [19]
Yokoya et al.

[11] Patent Number: 5,524,287
[45] Date of Patent: Jun. 4, 1996

[54] RADIO COMMUNICATION APPARATUS

[75] Inventors: Satoshi Yokoya; Hiroshi Yasuda, both of Kanagawa; Ryuji Oki, Tokyo; Nobuhiko Watanabe, Kanagawa, all of Japan

[73] Assignee: Sony Corporation, Tokyo, Japan

[21] Appl. No.: 242,337

[22] Filed: May 13, 1994

[30] Foreign Application Priority Data

May 17, 1993 [JP] Japan ..................................... 5-139096

[51] Int. Cl.⁶ .............................. H01Q 11/12; H04B 1/04
[52] U.S. Cl. ............................ 455/126; 455/127; 455/69; 455/115
[58] Field of Search .......................... 455/62.1, 69, 115, 455/126, 127

[56] References Cited

U.S. PATENT DOCUMENTS

| | | | |
|---|---|---|---|
| 4,870,698 | 9/1989 | Katsuyama et al. | 455/69 |
| 5,086,508 | 2/1992 | Furuno | 455/69 |
| 5,101,507 | 3/1992 | Jung | 455/127 |
| 5,129,098 | 7/1992 | McGirr et al. | 455/69 |
| 5,239,695 | 8/1993 | Jung | 455/126 |
| 5,386,589 | 1/1995 | Kanai | 455/69 |

FOREIGN PATENT DOCUMENTS

| | | |
|---|---|---|
| 0160993 | 11/1985 | European Pat. Off. . |
| 0392079 | 10/1990 | European Pat. Off. . |
| 2229609 | 9/1990 | United Kingdom . |

*Primary Examiner*—Reinhard J. Eisenzopf
*Assistant Examiner*—Marsha D. Banks-Harold
*Attorney, Agent, or Firm*—Jay H. Maioli

[57] ABSTRACT

A radio communication apparatus comprises a transmitting circuit, a receiving circuit, an amplifier, a control circuit and a detecting circuit. The receiving circuit receives a signal from an opposite station such as a base station. The transmitting circuit transmits a signal to the opposite station. The amplifier amplifies the signal to be transmitted from the transmitting circuit. The control circuit controls the level of the transmission signal outputted from the amplifier. The detecting circuit detects the reception state in response to the reception level or the error rate of the signal transmitted from the opposite station. And the control circuit selectively switches, in response to the detection signal obtained from the detecting circuit, the output level of the transmission signal obtained via the amplifier from a high-level mode to a low-level mode when the reception state of the signal transmitted from the opposite station satisfies a preset value.

12 Claims, 8 Drawing Sheets

FIG. 1

| MAC | TRANSMISSION OUTPUT [dBW] | | | ALLOWABLE RANGE [dB] |
|---|---|---|---|---|
| | CLASS 1 | CLASS 2 | CLASS 3 | |
| 000 | +6 | +2 | −2 | +2 / −2 |
| 001 | +2 | +2 | −2 | |
| 010 | −2 | −2 | −2 | |
| 011 | −6 | | | +2 / −4 |
| 100 | −10 | | | |
| 101 | −14 | | | |
| 110 | −18 | | | |
| 111 | −22 | | | |

FIG. 4

| MAC | H MODE | L MODE | (ALLOWABLE OUTPUT) |
|---|---|---|---|
| 0 0 0 | -1 | -3 | -2 $^{+2}_{-2}$ |
| 0 0 1 | -1 | -3 | |
| 0 1 0 | -1 | -3 | |
| 0 1 1 | -6 | | -6 $^{+2}_{-4}$ |
| 1 0 0 | -10 | | -10 $^{+2}_{-4}$ |
| 1 0 1 | -14 | | -14 $^{+2}_{-4}$ |
| 1 1 0 | -18 | | -18 $^{+2}_{-4}$ |
| 1 1 1 | -22 | | -22 $^{+2}_{-4}$ |

UNIT : dBW (dB)

RADIO COMMUNICATION APPARATUS

BACKGROUND OF THE INVENTION

1. Field of the Invention

The present invention relates to a radio communication apparatus and, more particularly, to an apparatus where the output level of a transmission signal is adjustable.

2. Description of the Related Art

In a duplex mobile telephone system inclusive of portable telephones and car telephones such as a cellular phone system, a base station is capable of controlling or designating the transmission output of a mobile station. This is to accomplish the purpose of suppressing the transmission output of a mobile station to the minimum value required for the base station, so as to increase the number of mobile stations, which can utilize the system, by using the same channel even in a cell (service area) of the other base station.

In the TACS (Total Access Communication System), the control or designation of the transmission output of a mobile station is realized by transmission of a code termed MAC (Mobile Attenuation Code) from the base station to the mobile station. The relationship between the MAC and the transmission output is shown in FIG. 1. More specifically, the MAC is data of 3 bits, and therefore it is possible to designate the transmission output in the maximum of 8 steps. The transmission output is classified into three classes from 1 to 3; i.e., class 1 is assigned to car telephones or the like, class 2 to car telephones and shoulder-type mobile telephones, and class 3 to handy-type portable telephones, respectively.

Accordingly, in a car telephone of the class 1, its transmission output is controlled or designated in 8 steps at an interval of 4 dB. Meanwhile in a portable telephone of the class 3, its maximum output is predetermined to be less than half the value in the car telephone of the class 1 in consideration of the service life of a battery used as a power supply.

Further, although some errors are permitted legally in such transmission outputs, the allowable error range of each transmission output is set to be relatively wide as shown in FIG. 1.

A method of changing the transmission output in accordance with the MAC will now be described below with reference to FIG. 2. FIG. 2 is a block diagram of a radio communication apparatus which is a premise of the present invention.

In FIG. 2, there is shown a mouthpiece 11, an audio circuit 12, a transmitting circuit 13, a power amplifier 14, a duplexer 15, a transmitting/receiving antenna 16, a receiving circuit 17, and an earpiece 18.

When a sound signal from the mouthpiece 11 is supplied via the audio circuit 12 to the transmitting circuit 13, it is converted into an up-channel transmission signal (FM signal) S13. This transmission signal is amplified in the power amplifier 14. This amplified signal S13 is supplied via the duplexer 15 to the antenna 16, from which the signal S13 is transmitted to the base station.

Meanwhile a down-channel FM signal (transmission signal) from the base station is received at the antenna 16. The signal thus received is supplied via the duplexer 15 to the receiving circuit 17, so that the sound signal from the talker is extracted. Thereafter the sound signal thus extracted is supplied via the audio circuit 12 to the earpiece 18.

Denoted by 21 is a system controller which consists of a microcomputer. The transmitting circuit 13 and the receiving circuit 17 are connected to each other via a modem circuit 22, whereby a predetermined command signal or data such as MAC can be accessed between the system controller 21 and the base station. Further, the audio circuit 12, the transmitting circuit 13 and the receiving circuit 17 are controlled by the system controller 21 in response to the command signal or the data received from the base station. Denoted by 23 is an operation key such as a dial key or a talk key.

Reference numeral 30 denotes an APC (Auto Power Control) circuit for controlling the transmission output in accordance with the MAC. Data D31 is obtained from an output port of the system controller 21 having a latch function. The data D31 is used for designating the transmission output and has, e.g., complementary correlation to the MAC. The data D31 is supplied to a D-A converter 31, where a digital-to-analog conversion is executed to convert the data D31 into an analog voltage V31. The voltage V31 thus obtained through the digital-to-analog conversion is supplied as a reference voltage to a voltage comparator 32. Further the transmission signal from the power amplifier 14 is partially supplied to a detector 33, which then outputs a DC-voltage V33 of a level corresponding to the level or amplitude of the transmission signal S13, and then the voltage V33 is supplied to the comparator 32.

The emitter-collector junction of a transistor 35 is connected in series between a power supply terminal 34 and a power line of the amplifier 14, and a comparison output voltage V32 obtained from the comparator 32 is supplied to the base of the transistor 35 as a control signal for the transistor 35.

Accordingly, when the comparison output voltage V32 is changed, the operating voltage supplied to the amplifier 14 is also changed in correspondence to such a voltage change. And due to the change caused in the operating voltage, there occurs a change in the level of the transmission signal S13 to be outputted from the amplifier 14. In this stage, feedback is being executed by the comparator 32 in such a manner as to render V32=V31, so that the level (V33) of the transmission signal S13 outputted from the amplifier 14 becomes equal to the level of the voltage V31.

Therefore, the level of the transmission signal S13 can be controlled in the system controller 21 by controlling the value of the data D31, whereby the base station is enabled to control or designate the transmission output of the mobile station in accordance with the MAC.

In the mobile telephone system, as described above, the transmission output of a mobile station is suppressed to the necessary minimum value. Practically, however, fine designation of the transmission output is not executed in a base station and the maximum output is permitted in most cases. In other words, the current consumption in a mobile station becomes large.

In this case, if the mobile station is a car telephone of the class 1, substantially no problem exists with respect to the current consumption since the operating power is supplied from a car battery. However, in a portable telephone of the class 3 which uses the battery incorporated therein for its operation, the service life of the battery is shortened if the current consumption is large, hence shortening the effective time for communication.

Even if the base station executes fine designation of the transmission output, the allowable range of the transmission output is as wide as +2 dB to −4 dB (or −2 dB). Therefore, in the stage of designing or manufacturing a portable telephone, the current consumption thereof varies widely depending on whether the transmission output is set to a rated value of +2 dB or −2 dB, whereby the service life of the battery is considerably changed.

Furthermore, when a portable telephone and a base station are connected to each other at the time of an originating call or a terminating call, it is necessary, for achieving enhanced connection, to perform handshake of the data required for control of the connection at the highest possible level. However, if such operation is performed, the transmission output during a call is increased within the allowable range to consequently cause wasteful consumption of the battery.

SUMMARY OF THE INVENTION

It is therefore an object of the present invention to provide a radio communication apparatus which solves the problems mentioned above.

According to one aspect of the present invention, there is provided a radio communication apparatus including a transmitting circuit, a receiving circuit, an amplifier, a control circuit and a detecting circuit. The receiving circuit receives a signal from an opposite station. The transmitting circuit transmits a signal to the opposite station. The amplifier amplifies the signal to be transmitted from the transmitting circuit. The control circuit controls the output transmission signal of the amplifier to a corresponding level. The detecting circuit detects the state of reception of the signal transmitted from the opposite station. And the control circuit performs, in response to the detection signal obtained from the detecting circuit, selective control in such a manner as to switch the output level of the transmission signal, which is obtained via the amplifier, from a high-level mode to a low-level mode or from a low-level mode to a high-level mode.

According to another aspect of the present invention, there is provided a radio communication apparatus including a transmitting circuit, a receiving circuit, an amplifier, a control circuit and a detecting circuit. The receiving circuit receives a signal from an opposite station. The transmitting circuit transmits a signal to the opposite station. The amplifier amplifies the signal to be transmitted from the transmitting circuit. The control circuit controls the output transmission signal of the amplifier to a corresponding level. The detecting circuit detects the state of reception of the signal transmitted from the opposite station. And the control circuit first detects, in response to the output signal of the detecting circuit, whether the reception level of the signal transmitted from the opposite station satisfies a preset value during every predetermined period of time and, if the result of such detection signifies that the reception level of the signal transmitted from the opposite station satisfies the preset value, the control circuit lowers the level of the transmission signal within a prescribed range.

According to a further aspect of the present invention, there is provided a radio communication apparatus including a transmitting circuit, a receiving circuit, an amplifier, a control circuit and a detecting circuit. The receiving circuit receives a signal from an opposite station. The transmitting circuit transmits a signal to the opposite station. The amplifier amplifies the signal to be transmitted from the transmitting circuit. The control circuit controls the output transmission signal of the amplifier to a corresponding level. The detecting circuit detects the state of reception of the signal transmitted from the opposite station. And the control circuit executes its control action in response to the output signal of the detecting circuit in such a manner as to lower the level of the transmission signal within a prescribed range when the error rate of the signal transmitted from the opposite station satisfies a preset value.

In the present invention, the current consumption can be reduced, in a call mode, by lowering the output level of the transmission signal only when the reception state of the signal transmitted from the opposite station satisfies the predetermined condition. It is considered that, when the reception state satisfies the predetermined condition, the opposite station is also receiving the radio waves exactly, hence preventing deterioration of the speech quality. Furthermore, if a battery is used as a power supply, it becomes possible to prolong the service life of the battery. In addition, since the output level of the transmission signal is lowered, it is possible to reduce a disturbance to the opposite station. Besides the above, due to the fact that the output level of the transmission signal is adjusted within the allowable range of the transmission output, there occurs no deterioration of the speech quality.

The above and other features and advantages of the present invention will become apparent from the following description which will be given with reference to the illustrative accompanying drawings.

BRIEF DESCRIPTION OF THE DRAWINGS

FIG. 1 shows exemplary standards of transmission outputs;

FIG. 4 shows an exemplary combination of transmission outputs of a portable telephone according to the invention;

FIGS. 6A and 6B are explanatory diagrams illustrating an example of how the output level of the portable telephone of the present invention is controlled, in which FIG. 6A is a waveform chart of the output voltage of a receiving circuit obtained from a detecting circuit, and FIG. 6B is a waveform chart showing changes of the transmission output level;

FIGS. 7A and 7B are explanatory diagrams illustrating another example of how the output level of the portable telephone of the present invention is controlled, in which FIG. 7A is a waveform chart of the output voltage of the receiving circuit obtained from the detecting circuit, and FIG. 7B is a waveform chart showing changes of the transmission output level.

DESCRIPTION OF THE PREFERRED EMBODIMENTS

Figure 2:
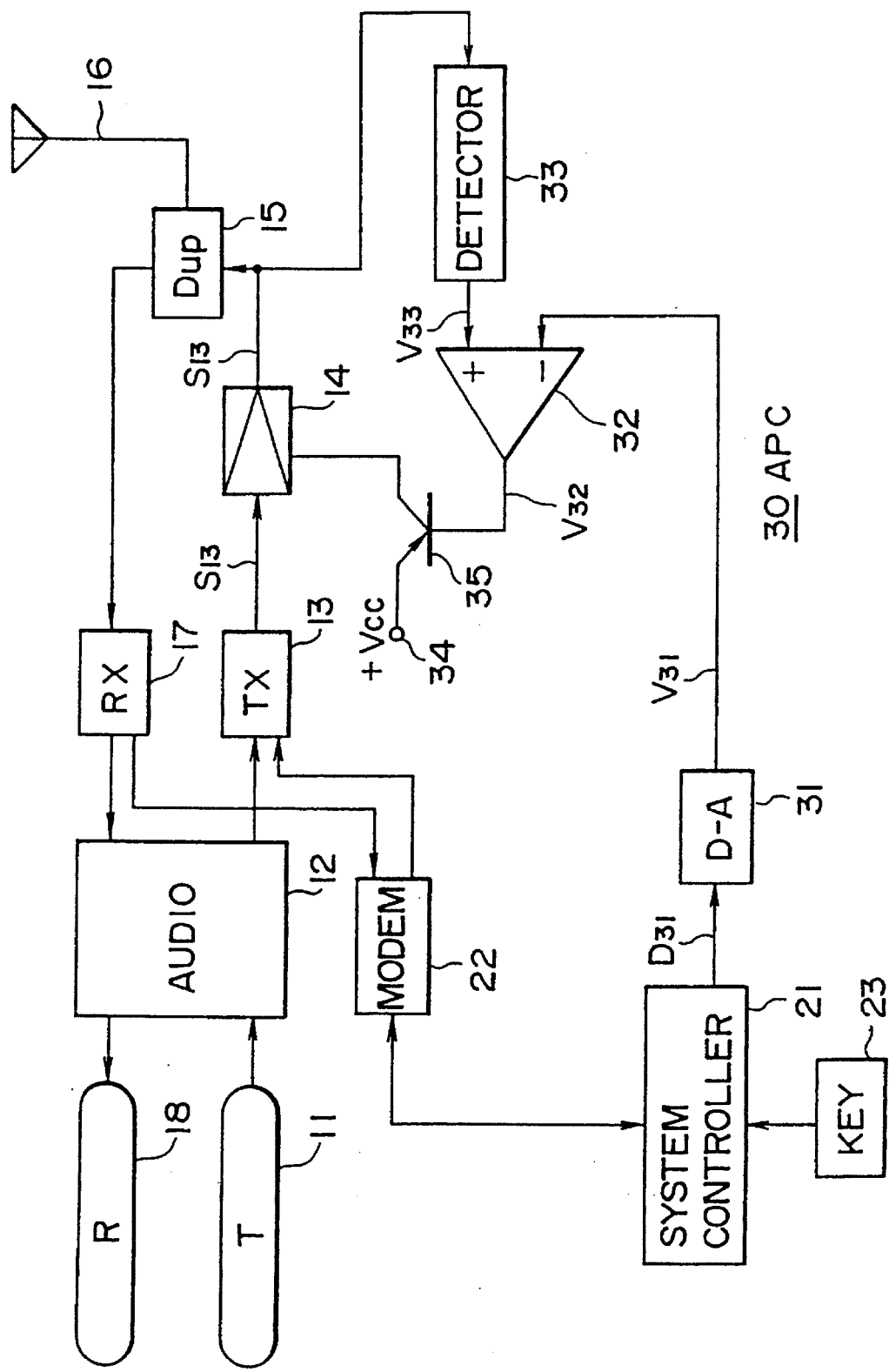
FIG. 2 is a block diagram of a radio communication apparatus which is a premise of the present invention.
Figure 3:
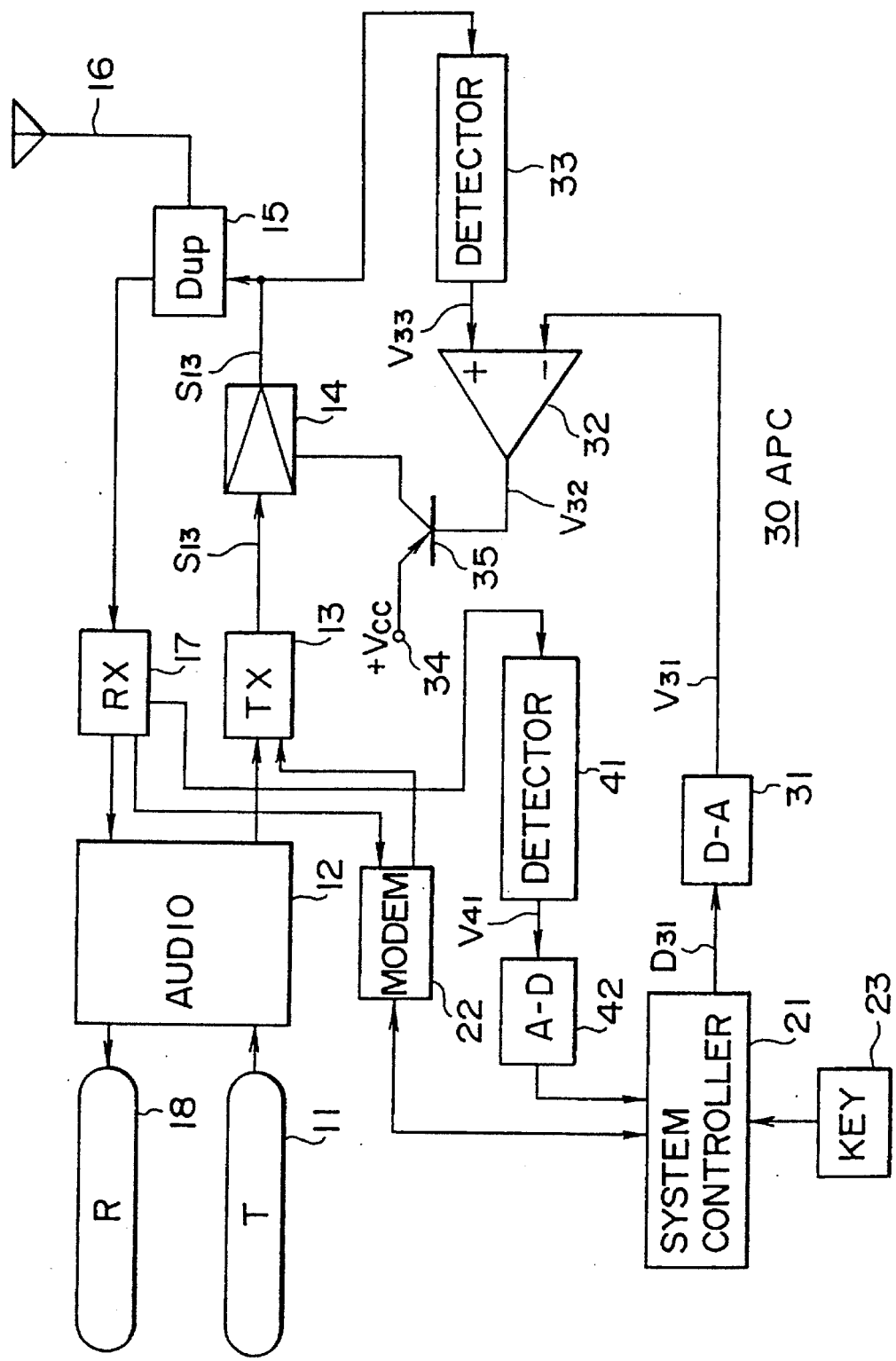
FIG. 3 is a block diagram of a portable telephone in a first embodiment of the present invention.

FIG. 3 shows a first embodiment of the present invention applied to an analog portable telephone, wherein like component elements corresponding to those in FIG. 2 are denoted by the same reference numerals, and a detailed description thereof conforms with the foregoing explanation.

An intermediate-frequency signal, for example, is supplied from a receiving circuit 17 to a detecting circuit 41, and a signal voltage V41 representing the reception level of a down-channel FM signal is outputted from the circuit 41. The voltage V41 thus obtained is supplied to an A-D converter 42 where analog-to-digital conversion is executed. Thereafter the signal V41 obtained through such analog-to-digital conversion is supplied to a system controller 21 as a parameter indicating the reception state of the down-channel FM signal.

When MAC="000" to "010" as shown in FIG. 4, there are prepared, in an allowable range, an H mode where the transmission output is high as −1 dBW and an L mode where the transmission output is low as −3 dBW. More specifically, relative to any MAC value where the current consumption is a problem, i.e., to any MAC value at the time of a great transmission output, there are prepared a high transmission output mode (H mode) and a low transmission output mode (L mode) within the allowable range. Such transmission output modes can be switched by changing the data D31.

Figure 5:
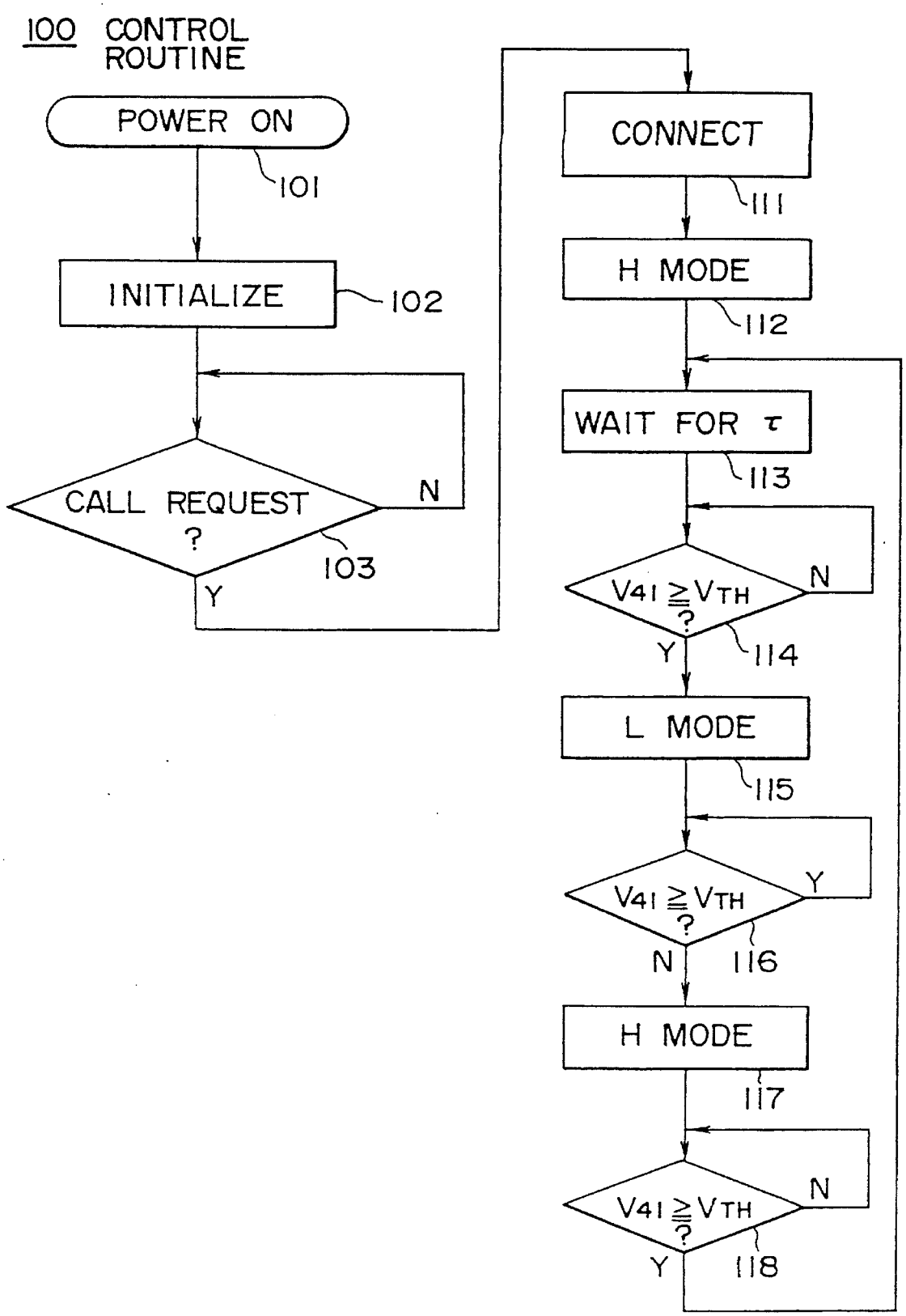
FIG. 5 is a flow chart showing a control routine executed in the portable telephone of the invention.

In a system controller 21, a control routine 100 of FIG. 5, for example, is prepared to execute selective switching of the transmission output to an H mode or an L mode under control. For the purpose of simplifying the explanation, there are omitted, in this control routine 100, a process for controlling the transmission output by the MAC received from a base station, and also a process for clear-down.

When a power supply is turned on in this construction, the processing sequence of the system controller 21 starts from step 101 of the control routine 100. Then at step 102, the component circuits are initialized. Thereafter at step 103, a check is executed as to whether a request for a terminating call or an originating call is existent or not. And if the result of such check signifies no request, the process of step 103 is repeated. In this manner, when the power supply is turned on, the telephone is placed in a standby mode. In this standby mode, some partial circuits inclusive of the receiving circuit and the system controller 21 operate to monitor a terminating call request in a control channel while monitoring an originating call request from a key 23.

When a terminating call request or an originating call request arrives in such a standby mode, the request is detected at step 103, and subsequently the processing sequence of the system controller 21 proceeds from step 103 to step 111. At this step 111, a process for connection to the base station is executed with setting of the transmission output to its maximum output level.

Figure 6:
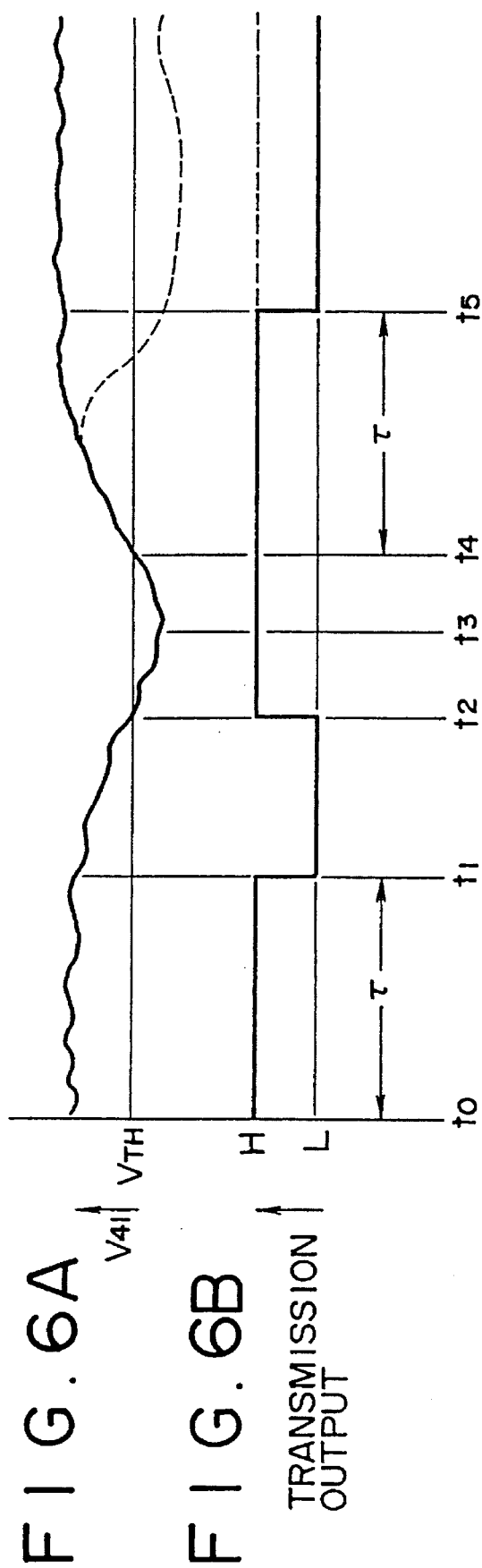

Upon completion of the connection to the base station, the processing sequence advances to step 112 where, as indicated at a time point t0 in FIG. 6B for example, the transmission output is set to an H mode (high output mode) out of those corresponding to the MAC designated by the base station. At the time point t0 of connection, as shown in FIG. 6A, a detection voltage V41 representing the reception level is higher than a predetermined threshold level VTH. In this manner, the telephone is shifted from step 111 to a call mode.

Subsequently, the processing sequence of the system controller 21 proceeds to step 113, where a wait is executed for a time period τ, e.g., 10 seconds, from the time point t0 to a next time point t1. Therefore, during the first period τ after connection of the telephone to the base station at the time point t0, a call is effected in the H mode regardless of any state of radio waves.

At the time point t1 after a lapse of the period τ the processing sequence proceeds from step 113 to step 114. At this step 114, a check is executed by the detection voltage V41 as to whether the reception level of the down-channel FM signal from the base station is above the predetermined threshold value or not. In other words, a check is executed as to whether the condition is V41≧VTH or not. If the result of such check signifies that the condition is not V41≧VTH, the process of step 114 is repeated. Accordingly, when the reception level of the down-channel FM signal is below the predetermined threshold value VTH, the call mode is kept on continuously with the transmission output being maintained in the H mode.

However, when the result of the check at step 114 signifies that the condition is V41≧VTH as indicated at the time point t1 in FIG. 6A, the processing sequence proceeds from step 114 to step 115. At this step 115, as indicated at the time point t1 in FIG. 6B, the transmission output is switched to an L mode. Thereafter the processing sequence advances to step 116. At this step, a check is executed again as to whether the condition is V41≧VTH or not. In the state of V41≧VTH as indicated at the time point t1, the process of step 116 is repeated. Accordingly, the transmission output is maintained in the L mode during the continuous state of V41≧VTH after the time point t1, but no problem arises therefrom since the transmission output is within the allowable range designated by the base station in accordance with the MAC.

Thus, the call is effected in the L mode continuously in the state of V41≧VTH. However, if the condition is changed to V41<VTH as indicated at a time point t2 for some reason, such a change is detected at step 116. In this case, the processing sequence proceeds from step 116 to step 117, and the transmission output is switched to the H mode as indicated at the time point t2 in FIG. 6B. Thereafter the processing sequence proceeds to step 118. At this step, a check is executed as to whether the condition is V41≧VTH or not. And if the result of such check signifies that the condition is V41<VTH, the process of step 118 is repeated. Accordingly, during the time period of V41<VTH as indicated from t2 to t4, the call mode is maintained in the state where the transmission output is set to the H mode.

However, if the condition is changed to V41≧VTH even in the H mode as indicated at the time point t4, such a change is detected at step 118, and the processing sequence returns from step 118 to step 113. Consequently, the operation subsequent to the time point t0 is repeated again from the time point t4. For example, if the condition is V41≧VTH at a time point t5 after a lapse of the periods Δ from the time point t4 as denoted by a solid line in FIG. 6A, the transmission output is set to the L mode as denoted by a solid line in FIG. 6B. However, if the condition is V41<VTH at the time point t5 as denoted by a broken line in FIG. 6A, the transmission output is left unchanged in the H mode as denoted by a broken line in FIG. 6B.

When a clear-down request arrives in a call mode, the processing sequence departs from the call mode, and a clear-down process is executed. Thereafter the processing sequence returns to step 102, and the telephone is set in a standby mode.

In this portable telephone, the transmission output is set to the L mode to be kept at a low level during the call mode as described above, whereby the current consumption is reduced to consequently prolong the service life of the power supply battery. It has been confirmed on the basis of experiments that the service life of the battery can be prolonged approximately 15 to 20 percent.

Since the transmission output is held at a low level in the call mode, it is possible to reduce the disturbance to any other base station.

Further, such suppression of the transmission output is performed merely when the reception level of a down-channel FM signal from the base station is sufficiently high, i.e., only when the reception level in the base station can also be considered sufficiently high. Consequently, even if the transmission output is suppressed to be low, it is still possible in the base station to exactly receive the up-channel radio waves from the portable telephone, hence preventing deterioration of the speech quality. In addition, control of the transmission output is performed within the allowable range of the transmission output designated in the base station, whereby the base station becomes capable of exactly receiving the up-channel radio waves from the portable station to prevent deterioration of the speech quality.

Furthermore, at the time of connection to the base station, any data required for control of such connection is transmitted in a state where the transmission output is set to the H mode, so that enhanced connection is achieved to thereby raise the probability of complete connection.

Figure 7:
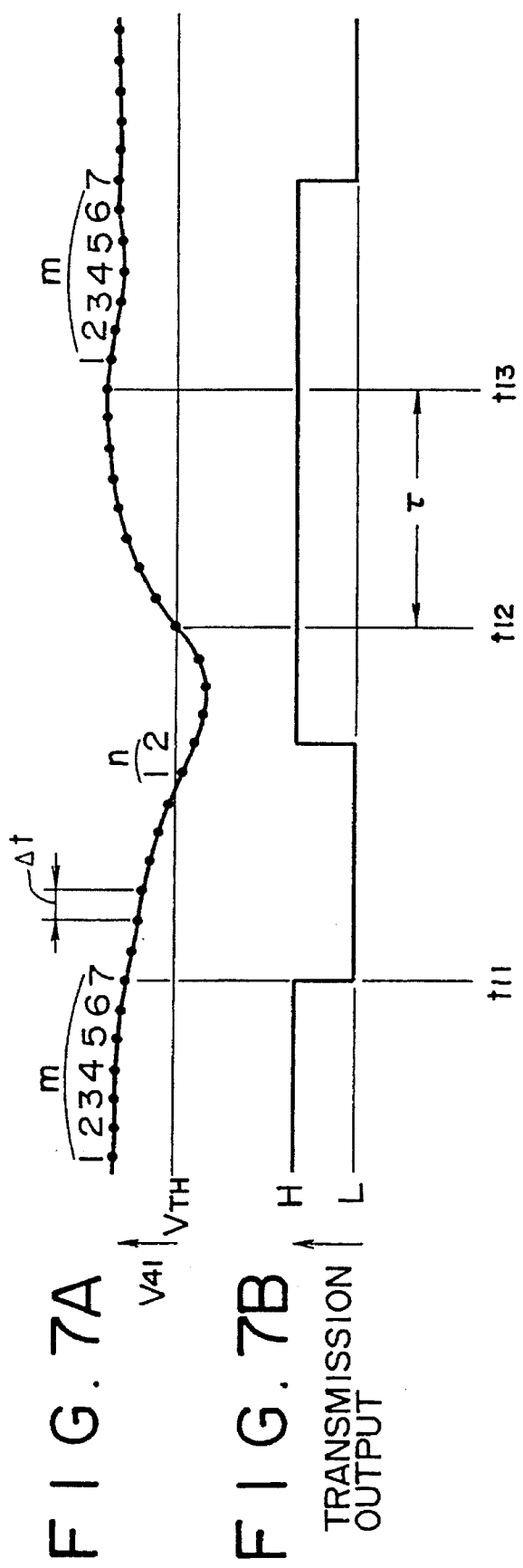

FIGS. 7A and 7B show other exemplary cases of selectively switching a transmission output to an H mode or an L mode under control. In these examples of FIGS. 7A and 7B, a check is executed in a call mode as to whether the voltage V41 satisfies the condition of V41≧VTH in every predetermined time period Δt (e.g., Δt=1 second) as denoted by a dot ".". And, as indicated at a time point t11 or t13, after a lapse of another predetermined time period τ, if a numerical value m (m≧2; e.g.., m=7) signifying the number of times of the continuous condition V41≧VTH has exceeded a preset value subsequent to setting of the transmission output to the H mode, then the transmission output is switched from the H mode to the L mode. Further, as indicated at a time point t12, if a numerical value n (n≧1, and n<m; e.g., n=2) signifying the number of times of the continuous condition V41<VTH has exceeded a preset value subsequently to setting of the transmission output to the L mode, then the transmission output is switched from the L mode to the H mode.

Accordingly, in the examples of FIGS. 7A and 7B also, the transmission output is suppressed in the call mode to consequently reduce the current consumption, hence prolonging the service life of the power supply battery. And it is further possible to diminish the disturbance to any other base station.

Figure 8:
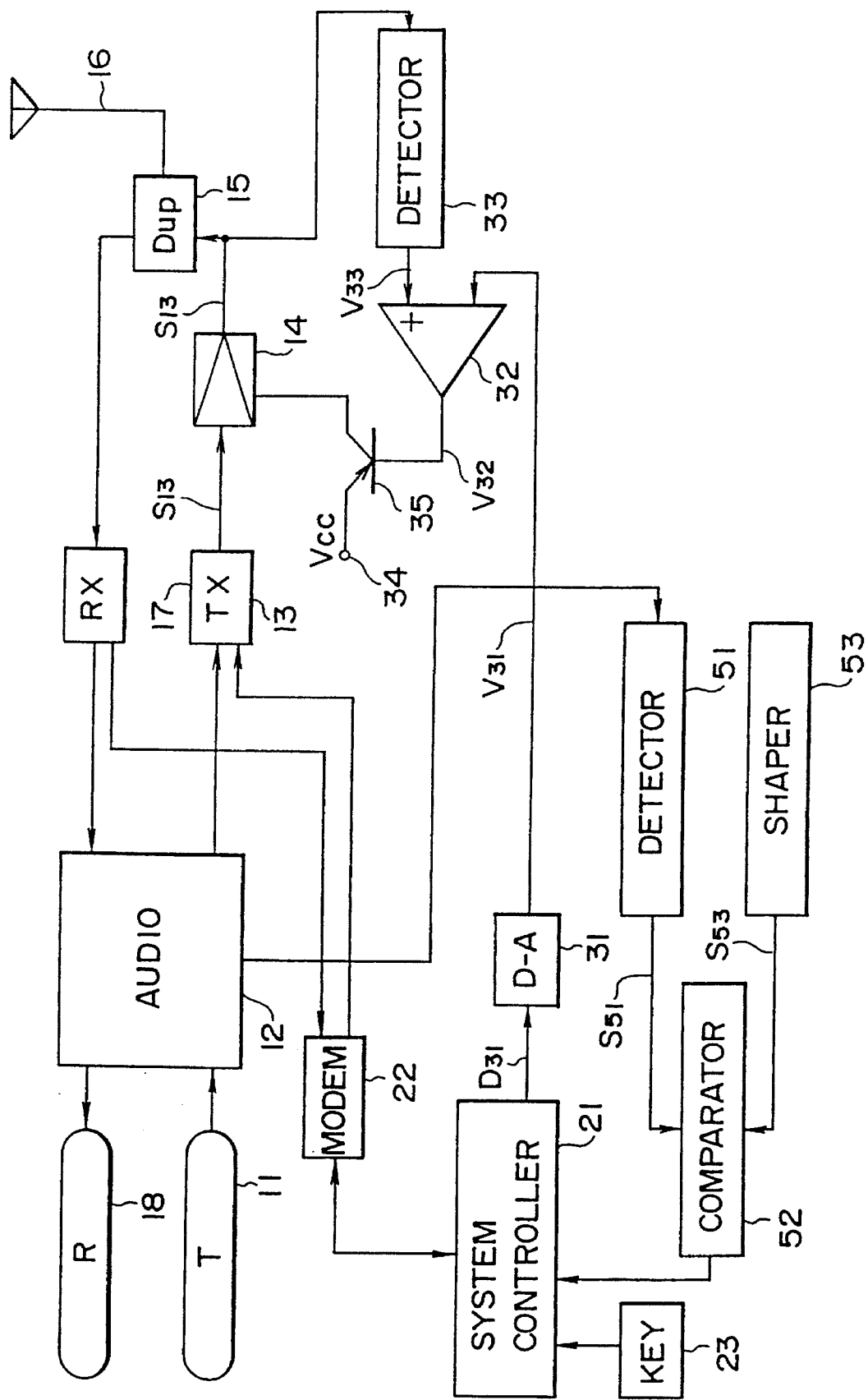
FIG. 8 is a block diagram of a portable telephone in a second embodiment of the present invention.

The first embodiment described above represents an exemplary case of applying the present invention to an analog portable telephone. Meanwhile, a digital portable telephone of the DTMA system is so constructed as shown in FIG. 8. Hereinafter a second embodiment of the present invention representing such a digital portable telephone will be described. In this diagram, any component circuits or elements corresponding to those used in FIG. 2 are denoted by the same reference numerals, and a detailed explanation thereof is omitted.

In the second embodiment, when the error generation frequency is low in a digital audio signal or digital data transmitted from a base station, it can be presumed that the error generation frequency is also low in a digital audio signal or digital data transmitted from a portable telephone and received at the base station.

In the second embodiment, processes of digital-to-analog conversion and time base correction are executed in an audio circuit 12. The output signal of the audio circuit 12 is partially supplied to a detecting circuit 51, which then extracts a BER signal S51 representing the bit error rate of the audio signal or data transmitted from the base station. The BER signal thus obtained is supplied to a comparator 52 as a parameter indicative of the reception state. Meanwhile a shaping circuit 53 outputs a signal S53 which indicates an allowable value of the bit error rate of the audio signal or data transmitted from the base station. The signal S53 is then supplied as a reference signal to the comparator 52.

In the comparator 52, the signal S51 is compared with the reference signal S53, and the comparison output thereof is supplied to a system controller 21.

In a call mode, the system controller 21 decides, in response to the comparison output of the comparator 52, the error generation frequency of the audio signal or data transmitted from the base station. If the error generation frequency is lower than the predetermined value indicated by the reference signal S53, the transmission output is set to an L mode. To the contrary, if the error generation frequency is higher than the predetermined value, the transmission output is set to an H mode. In case the error generation frequency is continuously kept less than the predetermined value for more than a preset period of time, then the transmission output is set to the L mode. And when the error generation frequency has exceeded the predetermined value, the transmission output is set immediately to the H mode.

Therefore, in the second embodiment as well, it is possible to minimize any wasteful consumption of the power supply battery to consequently prolong the effective usable time of the portable telephone. In addition, disturbance to any other base station can also be reduced.

In the aforementioned control routine 100 of FIG. 5, if the result of the check executed at step 114 signifies that the condition is V41<VTH, the processing sequence may be returned to step 113. It is also possible to use the reception-level detection voltage V41 as a signal indicating the logarithm of the reception level. Furthermore, an intermediate value between a high value (H mode) and a low value (L mode) may be prepared as another transmission output in addition thereto, and such transmission output may be changed in a multiplicity of steps. Besides the above, it is further possible in the system controller 21 to execute the processes of the circuits 51 to 53 by means of software. In this case also, similarly to the foregoing instances of FIGS. 6A, 6B, 7A and 7B, the transmission output can be switched to the L mode when there occurs no deterioration of the error rate for a predetermined period of time.

What is claimed is:

1. A radio communication apparatus comprising:

a receiving circuit for receiving a signal including a Mobile Attenuation Code transmitted from an opposite station;

a transmitting circuit for transmitting a signal to said opposite station;

an amplifier for amplifying the signal transmitted from said transmitting circuit;

a control circuit for controlling the transmission signal output from said amplifier so that it has a level within a range determined by said Mobile Attenuation Code; and a detecting circuit for detecting a reception state of the signal transmitted from said opposite station:

wherein said control circuit selectively switches, in response to a detection signal from said detecting circuit, the level of the transmission signal output from said amplifier from a high-level mode to a low-level mode or from a low-level mode to a high-level mode, the level in both modes being within said range.

2. The radio communication apparatus according to claim 1, wherein said control circuit controls said amplifier in response to the detection signal from said detecting circuit to lower the level of the transmission signal when the signal transmitted from said opposite station satisfies a preset value.

3. The radio communication apparatus according to claim 2, wherein said control circuit controls said amplifier in response to the detection signal from said detecting circuit to raise the level of the transmission signal to be within a prescribed range when the signal transmitted from said opposite station in the low-level mode of said transmission signal fails to satisfy the preset value.

4. The radio communication apparatus according to claim 3, wherein said control circuit controls said amplifier to maintain the output level of the transmission signal from said amplifier in the high-level mode during a predetermined period of time after connection to said opposite station.

5. A radio communication apparatus comprising:
   a receiving circuit for receiving a signal including a Mobile Attenuation Code transmitted from an opposite station;
   a transmitting circuit for transmitting a signal to said opposite station;
   an amplifier for amplifying the signal transmitted from said transmitting circuit;
   a control circuit for controlling the transmission signal output from said amplifier so that it has a level within a range determined by said Mobile Attenuation Code; and
   a detecting circuit for detecting a reception state of the signal transmitted from said opposite station:
   wherein said control circuit determines, in response to a detection signal from said detecting circuit, whether the reception level of the signal transmitted from said opposite station satisfies a preset value for a predetermined period of time and, if a determination result indicates that the reception level of the signal transmitted from said opposite station satisfies the preset value, said control circuit lowers the level of said transmission signal, said level being within said range.

6. The radio communication apparatus according to claim 5, wherein said control circuit controls said amplifier in response to the detection signal from said detecting circuit to switch the level of said transmission signal to the high-level mode within the prescribed range, if the detection indicates that the signal transmitted from said opposite station in the low-level mode of said transmission signal fails to satisfy the preset value.

7. The radio communication apparatus according to claim 6, wherein said control circuit controls said amplifier to maintain the output level of the transmission signal from said amplifier in the high-level mode during a predetermined period of time after connection to said opposite station.

8. A radio communication apparatus comprising:
   a receiving circuit for receiving a signal including a Mobile Attenuation Code transmitted from an opposite station;
   a transmitting circuit for transmitting a signal to said opposite station;
   an amplifier for amplifying the signal transmitted from said transmitting circuit;
   a control circuit for controlling a level of the transmission signal output from said amplifier so that it has a level within a range determined by said Mobile Attenuation Code; and
   a detecting circuit for detecting an error rate of the signal transmitted from said opposite station;
   wherein said control circuit controls said amplifier in response to a detection signal obtained from said detecting circuit to lower the level of the transmission signal to a low level when the error rate of the signal transmitted from said opposite station satisfies a preset value, said low level being within said range.

9. The radio communication apparatus according to claim 8, wherein said control circuit controls said amplifier in response to the detection signal from said detecting circuit to switch the level of said transmission signal to the high-level mode within the prescribed range, when the detection indicates that the error rate of the signal transmitted from said opposite station in the low-level mode of said transmission signal fails to satisfy the preset value.

10. The radio communication apparatus according to claim 9, wherein said control circuit controls said amplifier to maintain the output level of the transmission signa from said amplifier in the high-level mode during a predetermined period of time after connection to said opposite station.

11. A radio communication apparatus comprising:
    a receiving circuit for receiving a signal including a Mobile Attenuation Code transmitted from an opposite station;
    a transmitting circuit for transmitting a signal to said opposite station;
    an amplifier for amplifying the signal transmitted from said transmitting circuit;
    an extracting circuit for extracting data to control a transmission output level of said transmitting circuit in response to an output signal of said receiving circuit;
    a control circuit for controlling the transmission output level extracted by said extracting circuit so that it has a level within a range determined by said Mobile Attenuation Code; and
    a detecting circuit for detecting a reception level of the signal transmitted from said opposite station;
    wherein said control circuit determines, in response to a detection signal obtained from said detecting circuit, whether the reception level of the signal transmitted from said opposite station satisfies a preset value for a predetermined period of time and, if a determination result indicates that the reception level of the signal transmitted from said opposite station satisfies the preset value, said control circuit lowers the level of said transmission signal, said level of said transmission signal as lowered being within said range.

12. The radio communication apparatus according to claim 11, wherein said control circuit controls said amplifier in response to the data obtained from said extracting circuit to change the output level of the transmission signal stepwise in a plurality of steps, and further controls said amplifier in response to the detection signal obtained from said detecting circuit to switch the output level of the transmission signal to a lower step within a range prescribed with respect to each of said steps.

* * * * *